(12) United States Patent
Asano et al.

(10) Patent No.: US 8,842,573 B2
(45) Date of Patent: Sep. 23, 2014

(54) COMMUNICATION DEVICE

(75) Inventors: Takahiro Asano, Hamamatsu (JP);
Toshihiro Kimura, Hamamatsu (JP);
Nobuhiko Uemura, Hamamatsu (JP);
Akiyoshi Atsumi, Hamamatsu (JP)

(73) Assignee: Yamaha Corporation (JP)

( * ) Notice: Subject to any disclaimer, the term of this patent is extended or adjusted under 35 U.S.C. 154(b) by 232 days.

(21) Appl. No.: 13/380,543

(22) PCT Filed: Jun. 24, 2010

(86) PCT No.: PCT/JP2010/060761
§ 371 (c)(1),
(2), (4) Date: Dec. 23, 2011

(87) PCT Pub. No.: WO2010/150848
PCT Pub. Date: Dec. 29, 2010

(65) Prior Publication Data
US 2012/0093027 A1  Apr. 19, 2012

(30) Foreign Application Priority Data

Jun. 25, 2009 (JP) ................................. 2009-150879

(51) Int. Cl.
*H04J 1/16* (2006.01)
(52) U.S. Cl.
USPC .......................................................... 370/253
(58) Field of Classification Search
USPC ......... 370/253, 252, 232, 233, 235, 254, 241, 370/247, 248, 251, 242, 246, 312, 328, 332, 370/338, 349; 709/231, 224, 349
See application file for complete search history.

(56) References Cited

U.S. PATENT DOCUMENTS 6,614,763 B1   9/2003 Kikuchi et al.
7,415,528 B2 *  8/2008 Choi et al. .................... 709/231
(Continued)

FOREIGN PATENT DOCUMENTS

CN       1625157 A    6/2005
CN     101207573 A    6/2008
(Continued)

OTHER PUBLICATIONS

International Search Report of PCT/JP2010/060761.
(Continued)

*Primary Examiner* — Chi Pham
*Assistant Examiner* — Alexander O Boakye
(74) *Attorney, Agent, or Firm* — Rossi, Kimms & McDowell LLP

(57) ABSTRACT

Provided is a communication device for measuring a usable bandwidth without delay in transmission of primary data. The relay device according to an embodiment of the present invention, when measuring a usable bandwidth in communication with another relay device, processes a user packet including a user data to be transmitted to the other relay device so as to be changed into a specific packet size while the user data is maintained as it is, and utilizes it as a measurement packet. Accordingly, even though it is a measurement packet for performing measurement of a bandwidth, since it includes user data, it may be treated in the same manner as a user packet thereby enabling an efficient use of a communication network in communication. Also, even though UDP is used, since a usable bandwidth can be measured, it is possible to measure a bandwidth even though streaming data is distributed while preventing any influences on the distribution.

7 Claims, 8 Drawing Sheets

(56) References Cited

U.S. PATENT DOCUMENTS

| | | | |
|---|---|---|---|
| 7,693,077 B2 | 4/2010 | Kim et al. | |
| 8,185,056 B2 * | 5/2012 | Kotabe et al. | 455/67.11 |
| 2004/0228289 A1 | 11/2004 | Sano | |
| 2005/0122906 A1 | 6/2005 | Yazaki et al. | |
| 2006/0045023 A1 | 3/2006 | Kim et al. | |
| 2008/0144629 A1 | 6/2008 | Tomiyasu et al. | |
| 2008/0239981 A1 | 10/2008 | Kanda et al. | |
| 2009/0143020 A1 | 6/2009 | Kotabe et al. | |
| 2010/0110889 A1 | 5/2010 | Yazaki et al. | |

FOREIGN PATENT DOCUMENTS

| | | |
|---|---|---|
| CN | 101321083 A | 12/2008 |
| CN | 102176703 A | 9/2011 |
| JP | 2000-224172 A | 8/2000 |
| JP | 2002-152205 A | 5/2002 |
| JP | 2004-343227 A | 12/2004 |
| JP | 2006-74773 A | 3/2006 |
| JP | 2007-067925 A | 3/2007 |
| JP | 2008-182433 A | 8/2008 |
| JP | 2008-258877 A | 10/2008 |

OTHER PUBLICATIONS

Cao Le Thanh Man et al.; "ImTCP: TCP with an inline network measurement mechanism"; Institute of Electronics, Information and Communication Engineers; Technical Report of IEICE, pp. 1-10. NPL-2—Partial English translation provided.

Cao Le Thanh Man et al.; "ImTCP: TCP with an inline network measurement mechanism"; Institute of Electronics, Information and Communication Engineers; Technical Report of IEICE, pp. 1-10; May 14, 2004. http://ci.nii.ac.jp/vol_issue/nels/AN10013072/ISS0000167390_en.html.

Outline of Operation; http://web.archive.org/web/*/http://www.rtpro.yamaha.co.jp/RT/docs/*, Feb. 11, 2006 (via Internet Wayback Machine).

Chinese Office Action for corresponding CN201080028154.1, issue date Jun. 3, 2014. English translation provided.

* cited by examiner

COMMUNICATION DEVICE

TECHNICAL FIELD

The present invention relates to a technology for measuring a communication bandwidth that is usable in a data communication through a communication network.

BACKGROUND ART

In order to efficiently perform a data communication, there is a technology for measuring a communication bandwidth (hereinafter, referred to just as bandwidth) indicating a transmission rate that is usable in the data communication and for transmitting data in accordance with the measured bandwidth in a communication device such as a router for relaying communications (for example, see Patent Literature 1). By utilizing such technology, such communication device may measure a usable bandwidth in advance and perform a control so that data may not be transmitted beyond the usable bandwidth, thereby reducing packet loss in the communication network.

CITATION LIST

Patent Literature

Patent Literature 1: JP-A-2004-343227

SUMMARY OF INVENTION

Technical Problem

In the technology disclosed in Patent Literature 1, it is necessary to transmit a bandwidth measurement-dedicated packet when measuring a bandwidth that is usable in a data communication. Accordingly, for that reason, it is necessary to delay the transmission of primary data in order to transmit bandwidth measurement-dedicated packet.

The present invention has been made in an effort to solve the foregoing situation, and an object of the present invention is to provide a communication device for measuring a usable bandwidth without delaying transmission of primary data.

Solution to Problem

In order to solve the problem, an aspect of the present invention provides a communication device, including: a setting unit that is configured to set a test bandwidth indicative of a transmission rate to be tested in a communication with another device; an acquisition unit that is configured to acquire a user packet in which user data indicative of contents to be transmitted to the other device is packetized; a processing unit that is configured to assign measurement information indicative of the test bandwidth which is set by the setting unit to the user packet acquired by the acquisition unit, and to process the user packet to prepare a measurement packet so that a packet size of the measurement packet becomes a packet size corresponding to the test bandwidth; and a transmission unit that is configured to transmit the measurement packet prepared by the processing unit to the other device at intervals determined so as to come into an environment in the test bandwidth which is set by the setting unit.

In another preferred aspect, it further includes a resultant information receiving unit that is configured to receive resultant information which is transmitted from the other device which has received the measurement packet transmitted by the transmission unit, the resultant information being indicative of a result of comparing the test bandwidth with a reception-side transmission rate calculated in accordance with a reception aspect of the measurement packet.

In another preferred aspect, the setting unit is configured to change setting of the test bandwidth in accordance with the resultant information received by the resultant information receiving unit.

In another preferred aspect, the transmission unit is configured to transmit at least predetermined number of measurement packets, and when the number of measurement packets to be transmitted is insufficient as the number of the user packets does not reach the predetermined number, the transmission unit transmits a measurement packet prepared by processing a user packet including user data of a user packet which have been already transmitted.

An aspect of the present invention provides a communication device, including: a reception unit that is configured to receive a measurement packet in which user data indicative of contents to be transmitted by another device is packetized, to which measurement information indicative of a test bandwidth indicating a transmission rate to be tested in a communication with the other device is assigned, and which is processed so as to become a packet size according to the test bandwidth; an extracting unit that is configured to extract a user packet before processed, from the measurement packet received by the reception unit; and a measurement unit that is configured to measure a reception bandwidth indicative of a reception-side transmission rate from the other device based on a reception aspect of the measurement packet received by the reception unit.

In another preferred aspect, it further includes a resultant information transmitting unit that is configured to transmit resultant information indicative of a result of comparing the reception bandwidth measured by the measurement unit with the test bandwidth indicated by the measurement information assigned to the measurement packet received by the reception unit.

In another preferred aspect, the extracting unit is configured to discard a measurement packet received by the reception unit without performing an extraction from the measurement packet, when a user packet part before processed in the measurement packet received by the reception unit is identical to a user packet part before processed in a measurement packet which has been already received before.

Advantageous Effects of Invention

The aspects of the present invention can provide communication device for measuring a usable bandwidth without delay in transmission of primary data.

MODE FOR CARRYING OUT INVENTION

Hereinafter, embodiments of the invention are described with reference to the accompanying drawings.

Embodiment

Figure 1:
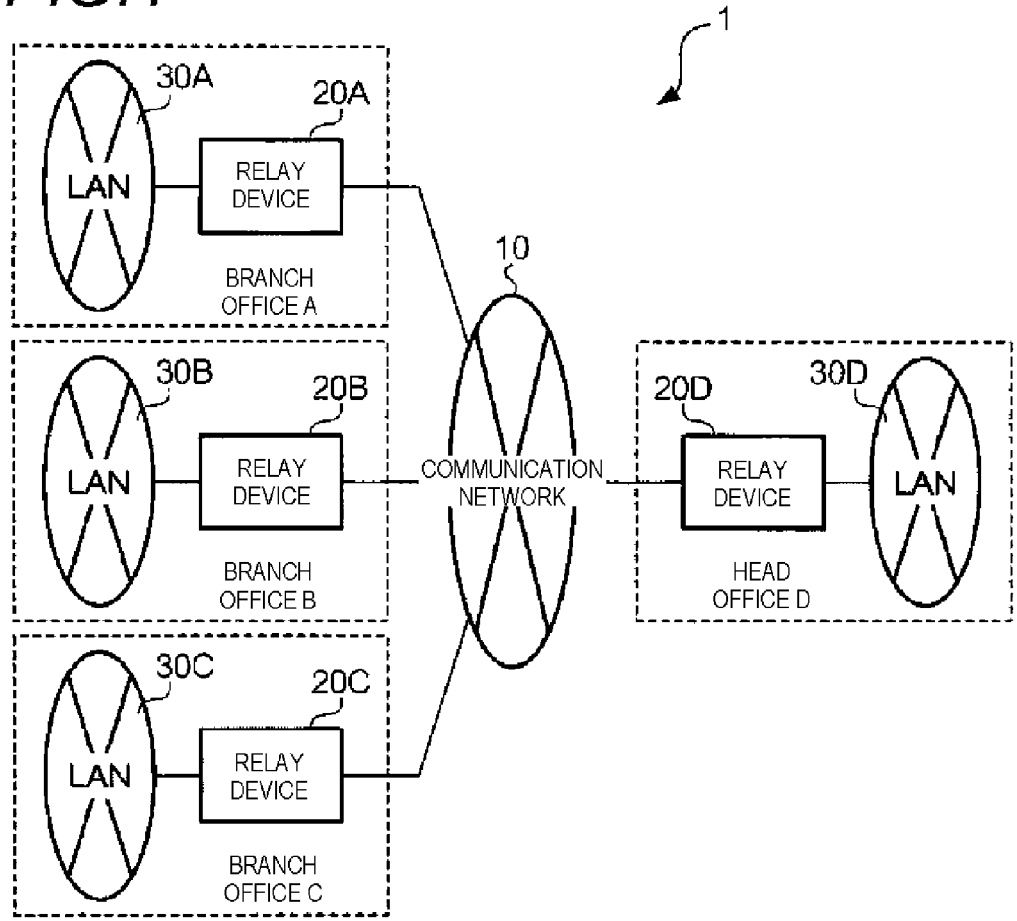
FIG. 1 is a block diagram showing the configuration of a communication system according to an embodiment of the present invention.

FIG. 1 is a block diagram showing the configuration of a communication system according to an embodiment of the invention. A communication system 1 includes relay devices 20A, 20B, 20C, 20D (hereinafter, referred to as relay device 20 in case where there is no need to distinguish one from the other) installed at each branch of a branch office A, a branch office B, a branch office C and a head office D of a company, and LANs (Local Area Network) 30A, 30B, 30C, 30D (hereinafter, referred to as LAN 30 in case where there is no need to distinguish one from the other) installed at each branch of a branch office A, a branch office B, a branch office C and a main office D of a company. Each relay device 20 connects each LAN 30 to a communication network 10 which is a public network such as the Internet.

The relay device 20 is, for example, a router, and corresponds to a communication device that receives packets which are data blocks transmitted from the communication network 10 in accordance with a specific communication protocol (for example, Internet Protocol) and that transmits, in a case where the packets are to be transmitted to each terminal of the LAN 30 as connected, the packets to a target terminal. The packets transmitted from the LAN 30 are transmitted to the relay device 20 connected to a target terminal.

In this embodiment, the relay device 20 employs a VPN router linked with another relay device 20 by means of a VPN (Virtual Private Network). The relay device 20 serves to encode packets when the packets are to be transmitted to the communication network 10 and decode packets when the packets are received from the communication network 10 and transmitted to the LAN 30. And, in this embodiment, the VPN is linked to the relay device 20D in the head office and each of the relay devices 20A, 20B, 20C in the branch offices A, B, C. Incidentally, other relay device 20 may be linked to means other than the VPN. Also, a communication protocol of the communication network 10 and a communications protocol of the LAN 30 may be converted from each other. Also, the branch offices include 3 bases of branch offices A, B, C as an example, but are not limited to the 3 bases in number and may include only one base, or more than three bases.

Figure 2:
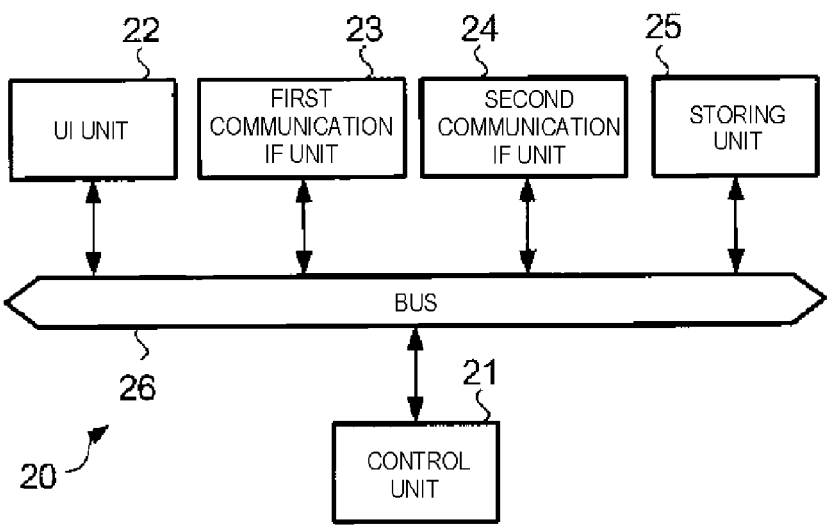
FIG. 2 is a block diagram showing the configuration of a relay device according to the embodiment of the invention.

FIG. 2 is a block diagram showing the configuration of the relay device 20 according to the embodiment of the present invention. The relay device 20 includes a control unit 21, a UI (User Interface) unit 22, a first communication IF (Interface) unit 23, a second communication IF unit 24 and a storing unit 25, and these units are connected to each other via a bus 26.

The control unit 21 includes CPU (Central Processing Unit), ROM (Read Only Memory), RAM (Random Access Memory), etc. The CPU reads a control program stored in the ROM to load it into the RAM thereby controlling each unit of the relay device 20 through the bus 26 and realizing a transmission-side bandwidth measurement section 210 for performing a transmission-side bandwidth measurement processing and a reception-side bandwidth measurement section 290 for performing a reception-side bandwidth measurement processing, and the like, which will be described later. Also, the RAM functions as a work area when the CPU performs processing of each data.

The UI unit 22 includes an operating unit such as a keyboard and an operating button which are used when an administrator of the relay device 20 performs various settings, and a display unit such as a liquid crystal display which serves to display a setting screen in response to a control of the control unit 21. The UI unit 22 outputs, when the operating unit is operated, data that is indicative of its operating contents to the control unit 21. Meanwhile, the UI unit 22 may not exist. In this case, various settings are performed by a remote control of an administration device (not shown) through a network such as the communication network 10 or LAN 30.

The first communication IF unit 23 and the second communication IF unit 24 indicate a communication unit such as a NIC (Network Interface Card) and the like. The first communication IF unit 23 is connected to the LAN 30. In more detail, the first communication IF units 23 of the relay devices 20A, 20B, 20C, 20D are connected to the LANs 30A, 30B, 30C, 30D, respectively. Meanwhile, the second communication IF unit 24 is connected to the communication network 10.

The first communication IF unit 23 and the second communication IF unit 24 each receive packets from a network connected thereto and output them to the control unit 21, and meanwhile transmit packets output from the control unit 21 to the network (communication network 10 or LAN 30) connected thereto.

The storing unit 25 indicates, for example, a hard disk, a nonvolatile memory, etc. and serves to read and write data by the control unit 21. The storing unit 25 stores therein the setting information indicative of contents set in the relay device 20 by the operation of the UI unit 22, and stores a part of control program, a routing table, etc. The foregoing description is an explanation of a configuration of the relay device 20.

Next, the transmission-side bandwidth measurement section 210, which is realized by the control unit 21 performing a control program, will now be described with reference to FIG. 3 to FIG. 6. The transmission-side bandwidth measurement processing in the transmission-side bandwidth measurement section 210 represents measuring a bandwidth which is usable between two relay devices 20 connected by a VPN. In this example, it is assumed a transmission-side bandwidth measurement processing in the relay device 20D which is installed in the head office D. The processing represents measurement of a bandwidth which is usable with respect to three relay devices 20A, 20B, 20C connected to the relay device 20D. Each function of the transmission-side bandwidth measurement section 210 which will be described hereinafter may be realized by hardware.

Figure 3:
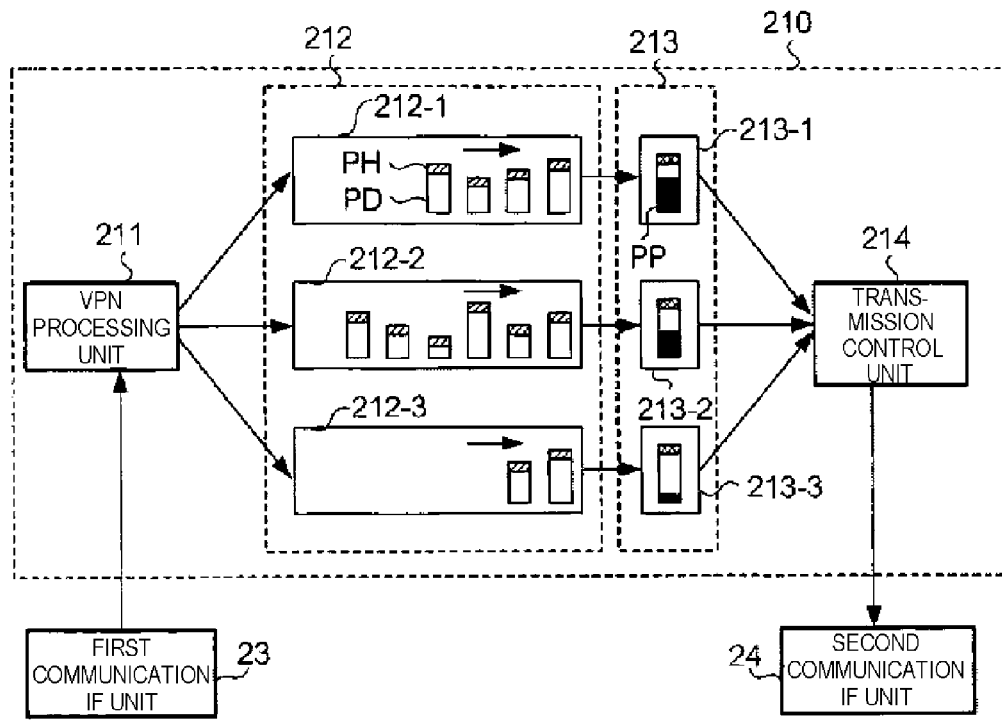
FIG. 3 illustrates the configuration of a transmission-side bandwidth measurement section in the relay device.

FIG. 3 illustrates a configuration of the transmission-side bandwidth measurement section 210. The transmission-side bandwidth measurement section 210 includes a VPN processing unit 211, a transmission queue 212, a processing unit 213, and a transmission control unit 214. The transmission queue 212 and the processing unit 213 are configured according to each class corresponding to the relay device 20 performing a link. In this example, the transmission queue 212-1 and the processing unit 213-1 are configured to correspond to the relay device 20A, the transmission queue 212-2 and the processing unit 213-2 are configured to correspond to the relay device 20B, and the transmission queue 212-3 and the processing unit 213-3 are configured to correspond to the relay device 20C, respectively. Hereinafter, when these queues and the units are not being distinct from each other, they are referred to as transmission queue 212 and processing unit 213, respectively.

The VPN processing unit 211 obtains packets output from the first communication IF unit 23 through the LAN 30, changes contents of a header part of the packets so as to form the VPN, and converts a user data part indicative of data to be transmitted with the packets to encoded packets (hereinafter, referred to as user packet). In this case, the header part has secured an area for describing measurement information that will be explained later. Also, in case where a user packet becomes larger than a predetermined upper limit of packet size (data amount), the user packet is divided into two or more user packets so as to be below the size. In this example, it is assumed that the upper limit of the user packet size is 400 bytes. And, the VPN processing unit 211 allows the transmission queue 212 to gain each of the converted user packets which corresponds to a target relay device 20.

The transmission queue 212 is a FIFO (First-In First-Out) type memory area in which a user packet is obtained from the VPN processing unit 211 and buffered until being read by the processing unit 213 to be transmitted. As shown in FIG. 3, each of the user packets buffered in the transmission queue is formed with a header part PH and a user data part PD, the sizes (data amount) of the user data part PD are varied, and the sizes of the user packets as a whole are also varied.

The processing unit 213 serves to read user packets from the transmission queue 212, perform processing of the user packets as described below and buffer the user packets until being read by the transmission control unit 214. And, when the processed user packets (hereinafter, referred to as measurement packet) have been read by the transmission control unit 214, the processing unit 213 again reads and processes user packets from the transmission queue 212.

Also, the control unit 21 serves to set a test bandwidth indicative of a bandwidth for testing whether to be usable first when measuring a usable bandwidth, by referring to setting information stored in the storing unit 25, previous bandwidth measurement results, bandwidths which are used in current transmission, etc. For example, a test bandwidth determined based on the setting information may be used as the test bandwidth, a bandwidth sensed as being usable lastly may be used as the test bandwidth, and a bandwidth beyond a bandwidth used in transmission of the current user packets may be used as the test bandwidth. Hereinafter, the processing will be described.

The processing unit 213 adds dummy data PP to the user packets so that the size of the read user packet becomes a size corresponding to the test bandwidth thus set. The size corresponding to the test bandwidth, in this example, may be 400 bytes identical to an upper limit of the user packet size determined in the VPN processing unit 211, but, there is no need to be necessarily identical to that and the size may be larger than the upper limit. Also, the size is not necessarily changed when the set test bandwidth is changed, and determined by the relationship with transmission intervals of the measurement packets, which will be described later.

Also, the processing unit 213 writes information relating to a test bandwidth and a test of bandwidth in an area for describing measurement information provided in the header part PH of the user packet, thereby assigning the measurement information to the user packet. In this way, the processing unit 213 performs processing of the user packet read from the transmission queue 212 thereby changing the user packet to the measurement packet.

Figure 4:
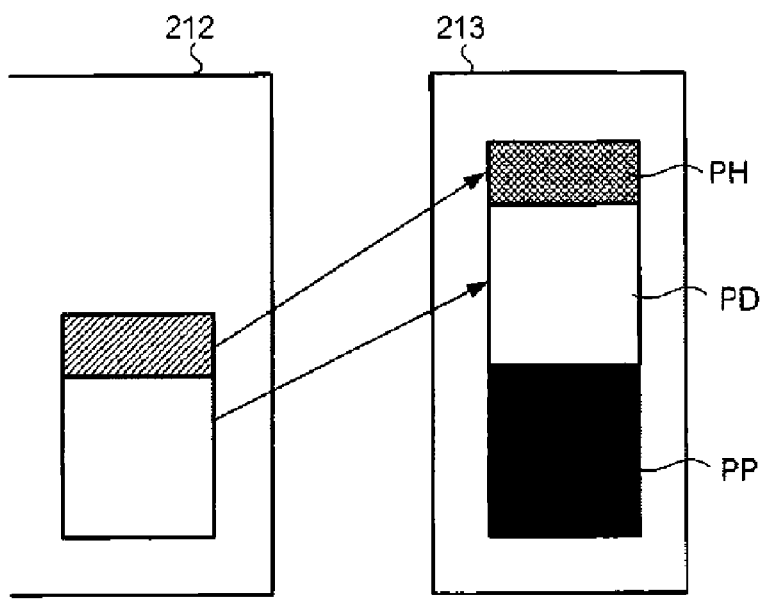
FIG. 4 illustrates a processing aspect of a measurement packet in a processing section.

FIG. 4 illustrates a processing aspect of measurement packets in the processing unit. As shown in FIG. 4, the processing unit 213 adds the dummy data PP to the last part of the user packet read from the transmission queue 212 so that the user packet becomes a size corresponding to the set test bandwidth. In the processing of the measurement packet, since the user data part PD is maintained as it is and the measurement information is just written on the header part PH, the sizes of the header part PH and the user data part PD are not changed. Accordingly, the size of the dummy data PP is determined as a value of 400 bytes minus a size of the user packet.

In this way, the dummy data PP is provided in the last part of measurement packet, but it is possible to distinguish by the description of the header part PH a part corresponding to the user data part PD in the measurement packet. For example, the size of the user data part PD is described in the header part PH, thereby it is possible to distinguish as to whether a part corresponding to the user data part PD belongs to which part of the measurement packet and thereafter it is sensed that the added data is the dummy data PP. Meanwhile, in the description of the header part PH, the size of the dummy data PP is included in the measurement information thereby a part corresponding to the user data part PD may be distinguished. Also, if a part corresponding to the user data part PD is configured to be distinguished by the description of the header part PH (the description in the measurement information is included), the dummy data PP may not be provided in the last part of the measurement packet.

Here, the dummy data PP may be meaningless data or meaningful data. For example, the dummy data PP itself may include contents indicating that it is different from the user data part PD. In this case, a part corresponding to the user data part PD may be distinguished based on the contents of the dummy data PP.

Figure 5:
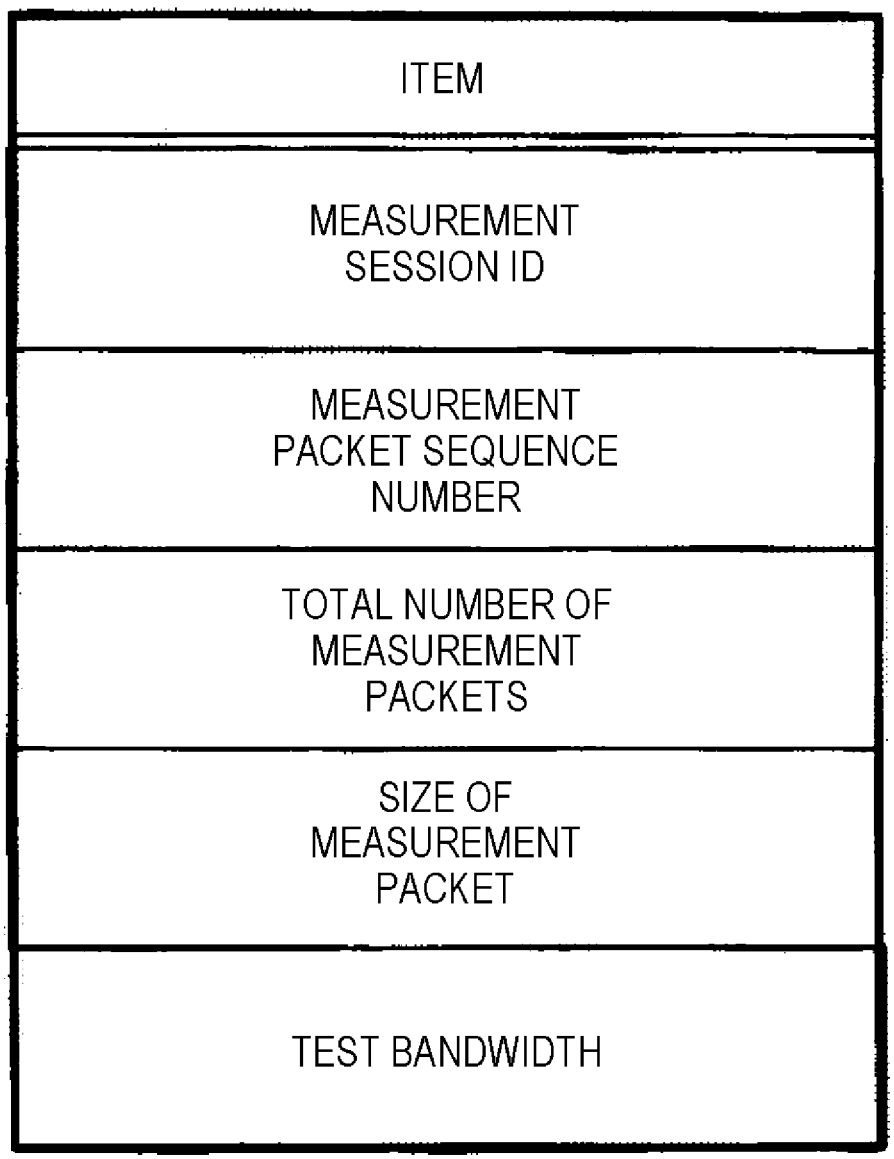
FIG. 5 illustrates measurement information on the measurement packet.

FIG. 5 illustrates measurement information that is described in the header part PH of measurement packet. The measurement information includes information indicating a measurement session ID, a measurement packet sequence number, the total number of measurement packets, a size of the measurement packet, and a test bandwidth. The measurement session ID is an ID assigned to each bandwidth test. Accordingly, the same ID is assigned to a series of measurement packets used in one bandwidth test.

The measurement packet sequence number represents the numbers assigned in transmission order to the series of measurement packets used in the bandwidth test. The total number of measurement packets represents the total number of the series of measurement packets used in the bandwidth test. For example, if the total number of measurement packets is 30, the measurement packet sequence numbers are assigned in order of 1 to 30 to each of the measurement packets transmitted.

The size of measurement packet indicates a size of measurement packet processed by the processing unit 213, that is, a size determined depending on a test bandwidth. In this example, the size is 400 bytes. The test bandwidth indicates a test bandwidth set by the control unit 21. The foregoing is described with reference to processing contents performed in the processing unit 213.

When reading a user packet from the transmission queue 212, in case where the user packet is the last user packet buffered in the transmission queue 212, the processing unit 213 copies and reads the user packet, thereby allowing the last user packet to remain in the transmission queue 212. Thereby, the transmission queue 212 continues to buffer at least one user packet. And, when other user packet is acquired by the transmission queue 212, the user packet remained in the transmission queue 212 is discarded.

Figure 6:
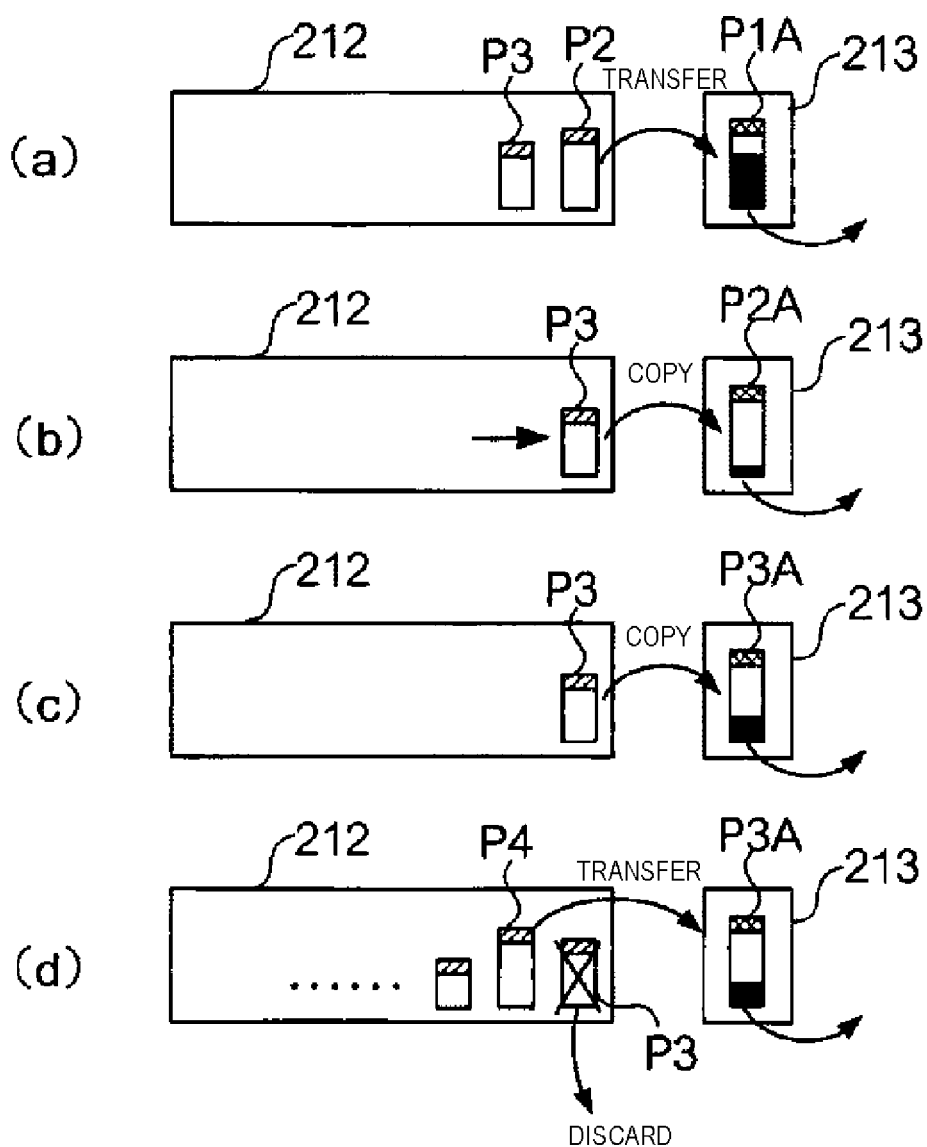
FIG. 6 illustrates an operation of a transmission-side bandwidth measurement processing.

FIG. 6 illustrates operations of copy and discard performed in the processing unit 213 during an operation of the transmission-side bandwidth measurement processing. First, in a state (a) of FIG. 6, the measurement packet P1A into which the user packet P1 has been processed is buffered in the processing unit 213, and the user packets P2, P3 are buffered in the transmission queue 212. And, if the measurement packet P1A is read by the transmission control unit 214, the user packet P2 is transferred to the processing unit 213 to thereby be processed. In FIG. 6, (b) shows a state where the user packet P2 is processed into the measurement packet P2A.

And, if the measurement packet P2A is read by the transmission control unit 214, the user packet P3 is read by the processing unit 213. In this case, since only the user packet P3 remains in the transmission queue 212, the processing unit 213 copies the user packet P3 to thereby read it and processes it into the measurement packet P3A (see (c) in FIG. 6). Until a new user packet is buffered in the transmission queue 212, the processing unit 213 copies the user packet P3 to read it whenever the measurement packet P3A is read by the transmission control unit 214, and continues to process it into measurement packet P3A.

And, if a new user packet P4 is buffered, the transmission queue 212 discards the user packet P3 which remains in the transmission queue 212 after being copied (see (d) in FIG. 6). Thereby, if the measurement packet P3A is thereafter read by the transmission control unit 214, the processing unit 213 reads the user packet P4 from the transmission queue 212.

In this way, even though the user packet is not acquired by the transmission queue 212 and the measurement packet lacks its sufficient number (total number of measurement packets) for being used in measurement, the user packet is copied and processed thereby enabling the measurement packet to be read by the transmission control unit 214. Meanwhile, if a new user packet is buffered in the transmission queue 212, the processing unit 213 may discard the copied measurement packet P3A buffered therein and immediately read the user packet P4 to thereby process it. The foregoing is an explanation relating to the processing unit 213.

The explanation is again returned to FIG. 3 and continues. The transmission control unit 214 reads measurement packets from the processing unit 213 at transmission intervals depending on a test bandwidth set by the control unit 21, thereby outputting them to the second communication IF unit 24 and transmitting the measurement packets to the target relay device 20. The transmission interval depending on a test bandwidth is determined by the relationship between a size of measurement packet processed in the processing unit and a test bandwidth having been set. In a case where the test bandwidth is TB (bps), the transmission interval is, in this example, (400×8)/TB (second). Meanwhile, if the transmission interval becomes too short, the load to be treated becomes large, thereby making an accurate transmission difficult. For that reason, if the size of measurement packet becomes too small, since the transmission interval becomes excessively short so that a test bandwidth may be maintained, it is preferable that the size of measurement packet is more than a size having been predetermined.

The transmission control unit 214 transmits measurement packets in this way, thereby enabling transmission of measurement packets to the target relay device 20 in the set test bandwidth. In this case, as described above, even though user packets are not acquired by the transmission queue 212, since the processing unit 213 copies and processes the user packets, measurement packets can be transmitted to the target relay device 20 so as not to be lower than the set test bandwidth.

And, as will be described later, when resultant information, which is transmitted as a result of receiving measurement packets from the target relay device 20 which has transmitted the measurement packets, is received by the second communication IF unit 24, the control unit 21 determines whether or not the test bandwidth is a usable bandwidth based on the resultant information.

The control unit 21 may find an upper limit of a usable bandwidth as follows. In a case where the tested bandwidth is a usable bandwidth, the control unit 21 changes the setting in a larger test bandwidth to thereafter repeat the foregoing processing. Also, in a case where it is not a usable bandwidth, the control unit 21 changes the setting in a smaller test bandwidth to thereafter repeat the foregoing processing. In a case where a test bandwidth to be set is changed, the transmission interval in the transmission control unit 214, or the size of measurement packet in the processing unit 213, or both may be changed. Also, measurement of the foregoing usable bandwidth may be performed at a predetermined timing, or whenever a predetermined time lapses. Otherwise, its performing time may be set.

In the foregoing description, an aspect of transmitting measurement packets to one relay device 20 has been explained. As shown in FIG. 3, however, in a case where measurement packets are transmitted to three relay devices 20 linked to each other, the foregoing processing may be performed in parallel with each of the transmission queues 212-1, 212-2, 212-3 and each of the processing units 213-1, 213-2, 213-3 interposed therebetween. In this case, test bandwidths are set according to each link. Meanwhile, in case where measurement of a usable bandwidth is not performed, the user packets buffered in the transmission queue 212 may be read by the transmission control unit 214, without the processing unit 213 interposed therebetween, at transmission intervals that are actively set in the control unit 21 according to the size of the user packet and the usable bandwidth. The foregoing is the description of the transmission-side bandwidth measurement section 210.

Next, the reception-side bandwidth measurement section 290, which is realized by performing a control program by the control unit 21 in the relay device 20 of a side of receiving measurement packets, will be explained with reference to FIG. 7. The reception-side bandwidth measurement processing in the reception-side bandwidth measurement section 290 includes receiving measurement packets, measuring a bandwidth being received based on the reception aspect (hereinafter, referred to as reception bandwidth), and responding the resultant information indicative of a result of comparing the reception bandwidth with the test bandwidth, with respect to the relay device 20 which has transmitted the measurement packets. Meanwhile, each function of the reception-side bandwidth measurement section 290 which will be explained below may be realized by hardware.

Figure 7:
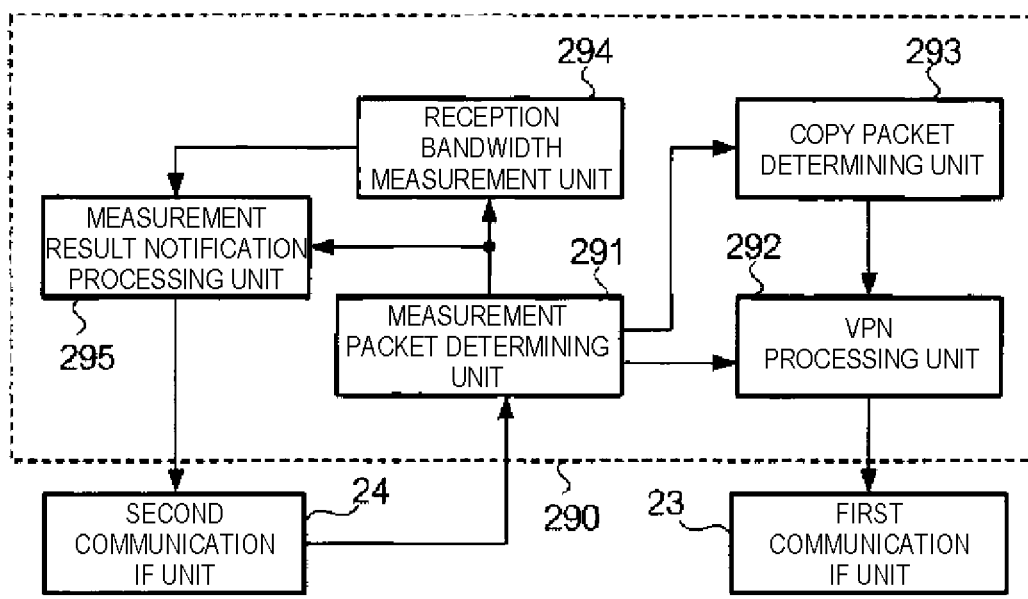
FIG. 7 illustrates the configuration of a reception-side bandwidth measurement section in the relay device.

FIG. 7 illustrates the configuration of the reception-side bandwidth measurement section 290. The reception-side bandwidth measurement section 290 includes a measurement packet determining unit 291, a VPN processing unit 292, a copy packet determining unit 293, a reception bandwidth measurement unit 294 and a measurement result notification processing unit 295.

The measurement packet determining unit 291 acquires packets received by the second communication IF unit 24 and determines whether or not the packet is a measurement packet. This determination is performed by checking the description of a header part PH of the packet. If measurement information is recorded therein, it is determined as a measurement packet.

And, in a case where it is determined as a measurement packet, the measurement packet determining unit 291 transfers the measurement packet to the copy packet determining unit 293. Also, the measurement packet determining unit 291 notifies the measurement result notification processing unit 295 of a test bandwidth and a measurement secession ID described in the measurement information. In this case, if the contents described in the measurement information is identical to the measurement session ID having already been notified, such notification may be omitted.

Also, the measurement packet determining unit 291 notifies the reception bandwidth measurement unit 294 of a set of the measurement session ID, the size of measurement packet, and a total number of measurement packets described in the measurement information, and also notifies of each sequence number and timing of receiving a measurement packet corresponding to the sequence number for each measurement session ID. Likewise with the foregoing, if the contents described in the measurement information is identical to the measurement session ID having already been notified, such notification of the measurement session ID, the size of measurement packet, and the total number of measurement packets as a set may be omitted. Incidentally, in a case where measurement packets are received from a plurality of relay devices 20, referring to the header part PH, information on identification of the relay device 20 which has transmitted the measurement packets is also notified to the reception bandwidth measurement unit 294 and the measurement result notification processing unit 295.

Meanwhile, in a case where it is determined that the packet received by the second communication IF unit 24 is not a measurement packet, that is, in a case where it is determined as a user packet, the measurement packet determining unit 291 transfers the user packet to the VPN processing unit 292.

Because the user data PD has been encoded during a processing in the VPN processing unit 211 of the transmission-side bandwidth measurement section 210, the VPN processing unit 292 decodes the user packet transferred from the measurement packet determining unit 291 to output it from the first communication IF unit 23 to the LAN 30 thereby transmitting it to a destination terminal. Also, since the measurement packet transferred from the copy packet determining unit 293 which will be described later has been added with the dummy data PP, the dummy data PP is removed therefrom while referring to the header part PH, thereby extracting a user packet before processed, and encoding the user packet to thereby output it from the first communication IF unit 23 to the LAN 30, thereby transmitting it to a destination terminal.

In this way, even though it is a measurement packet, the measurement packet can be treated in the same manner as in a user packet. Accordingly, just the measurement packet used in a measurement of a usable bandwidth is transmitted thereby making it possible to transmit its user data to a target terminal and accordingly it is possible to efficiently use the communication network 10.

The copy packet determining unit 293 determines whether or not the measurement packet transferred from the measurement packet determining unit 291 is a measurement packet produced by copying of a user packet. And, the measurement packet obtained by processing of a same user packet in the transmission-side bandwidth measurement section 210 is transmitted, thereby the copy packet determining unit 293 discards the newly transferred measurement packet having been used in the determination, if the user data part PD determines as it is same. Meanwhile, the copy packet determining unit 293 transfers the newly transferred measurement packet having been used in the determination to the VPN processing unit 292 if determining as it is not same.

The determination by the copy packet determining unit 293 is performed as follows in more detail. Generally, in the header part PH of a packet, information on a sequence number indicating which part among all data a user data included in the packet corresponds to is described. Accordingly, by storing it and referring to that, in a case where the same sequence number as the sequence number relating to the measurement packet having already been received is described in the header part PH of a measurement packet which will be transmitted later, the copy packet determining unit 293 determines that the measurement packet has the same user data, that is, as a user packet part before processed among the measurement packet is same. Meanwhile, in a case where information indicative of a state of copy is included in the header part PH of a measurement packet, the determination may be performed referring to the information.

The reception bandwidth measurement unit 294 measures a reception bandwidth based on the reception timing of a measurement packet and the size of the measurement packet. In this example, referring to the size of measurement packet and the time necessary to receive a series of measurement packets used in test of a bandwidth and a measurement packet sequence number, a bandwidth is calculated including a loss amount of packets and the calculation result is regarded as a measurement result of a reception bandwidth. And, the measured reception bandwidth is matched with a measurement session ID to thereby be notified to the measurement result notification processing unit 295. Meanwhile, measurement of the reception bandwidth is not limited to such measurement, but may be performed by other known methods using a size of measurement packet and reception timing. Known methods are disclosed, for example, in JP-A-2000-224172, JP-A-2002-152205, JP-A-2006-074773 and JP-A-2008-258877.

The measurement result notification processing unit 295 compares a reception bandwidth notified from the reception bandwidth measurement unit 294 with a test bandwidth notified from the measurement packet determining unit 291, thereby transmitting a resultant information indicating that the tested bandwidth is usable, if the reception bandwidth is not less than the test bandwidth, and transmitting a resultant information indicating that the tested bandwidth is not usable, if the reception bandwidth is less than the test bandwidth, from the second communication IF unit 24 to the relay device 20 which has transmitted the measurement packet used in measurement of the reception bandwidth in response to a result of receiving the measurement packet. The foregoing is described with reference to the reception-side bandwidth measurement section 290.

In this way, when measuring a bandwidth usable in communication with another relay device 20, the relay device 20 according to the embodiment of the present invention processes a user packet including the user data part PD to be transmitted to the other relay device 20 to thereby be changed in a specific packet size while the user data part PD is maintained as it is, and uses that as a measurement packet. Accordingly, even though it is a measurement packet for performing a measurement of a bandwidth, since it includes a user packet, the measurement packet may be treated in the same manner as in a user packet thereby enabling an efficient use of the communication network 10 in communication.

Also, in the communication system 1 employing such relay device 20, even though UDP (User Datagram Protocol) is used, since a usable bandwidth may be measured and a user data part PD is used in a measurement packet, it is possible to measure a bandwidth even though streaming data is distributed while preventing any influence on the distribution.

In the foregoing, the embodiment of the present invention has been described, and the present invention may be implemented in various aspects as follows.

Modification Example 1

In the previously described embodiment, as mentioned with reference to FIG. 6, at least one buffered user packet remains in the transmission queue 212, and the user packet is copied when it is read by the processing unit 213. In this way, measurement packets are transmitted so as not to be less than the test bandwidth. But it may be transmitted so as not to be less than the test bandwidth by another method. One example is explained with reference to FIG. 8.

Figure 8:
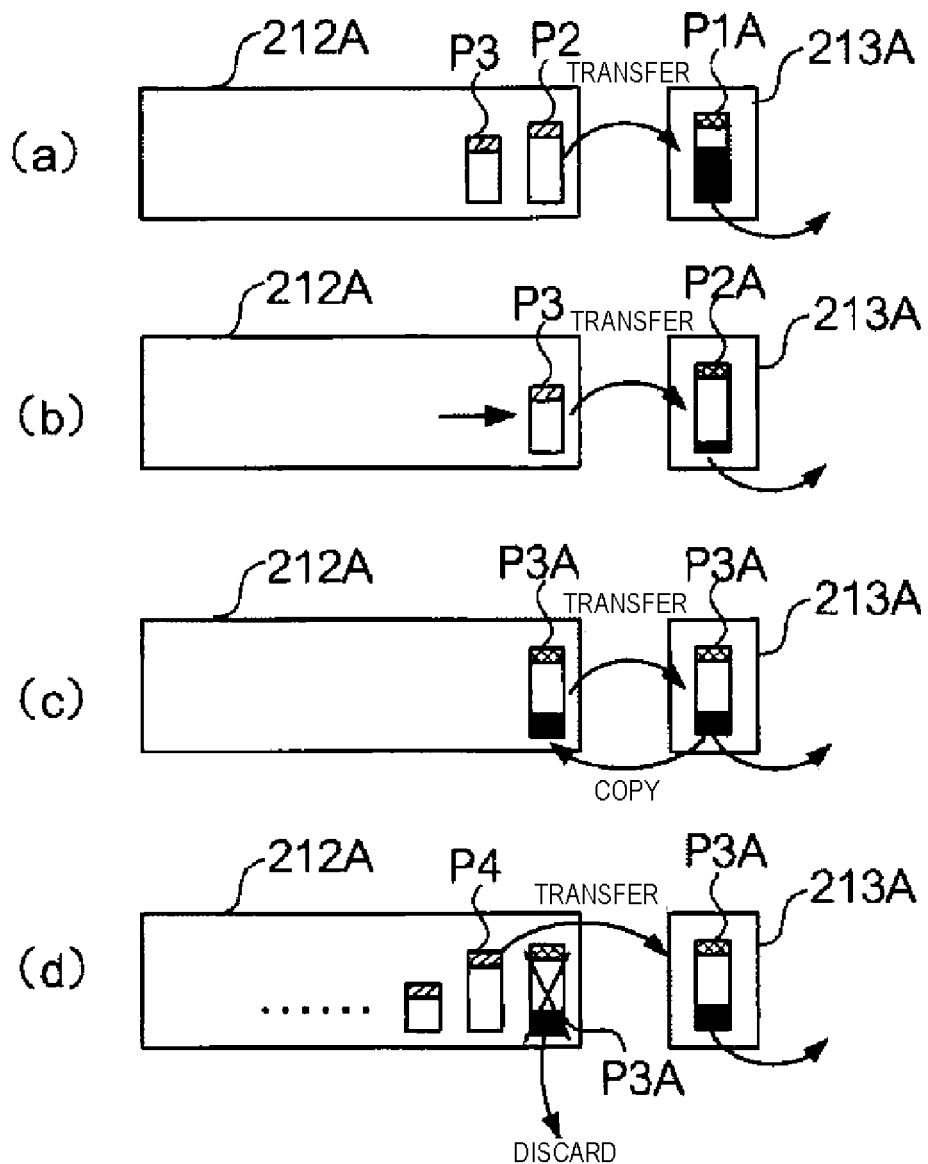
FIG. 8 illustrates an operation of a transmission-side bandwidth measurement processing according to a modification example 1.

FIG. 8 illustrates operations of the transmission queue 212A and the processing unit 213A during an operation of the transmission-side bandwidth measurement processing according to a modification example 1. Until reaching an operation shown by (b) in FIG. 8, the operation is the same as until reaching the operation shown by (b) in FIG. 6 in the previously described embodiment. According to the modification example 1, as shown by (b) in FIG. 8, when the measurement packet P2A is read, the processing unit 213A reads and processes the user packet P3 without copying, even though the user packet P3 in the transmission queue 212A is the last user packet. In this case, the processing unit 213A performs processing of the user packet P3, and at the same time, allows the measurement packet P3A obtained by processing to be copied and buffered in the transmission queue 212A (see (c) in FIG. 8).

And, when the measurement packet P3A is read from the processing unit 213A, the processing unit 213A reads the measurement packet P3A from the transmission queue 212A to thereby rewrite a measurement packet sequence number of measurement information (the number plus 1), and again copies the measurement packet P3A into the transmission queue 212A. Next, by repeating this processing, if a new user packet P4 is obtained from the VPN processing unit 211, likewise with the embodiment, the measurement packet P3A buffered in the transmission queue 212A is discarded ((d) in FIG. 8). In this way, at the time when the processing is performed in the processing unit 213A, since it is in a state where the dummy data PP has already been added, it has only to do re-record a part of the measurement information. Meanwhile, when the processing unit 213A performs reading from the transmission queue 212A, in a case where the target to be read is the measurement packet P3A, the processing unit 213A may copy the measurement packet P3A to thereby read it. In this case, since the measurement packet P3A is remained in the transmission queue 212A, the measurement packet P3A obtained by the processing performed in the processing unit 213A may not be copied into the transmission queue 212A.

Modification Example 2

In the previously described embodiment, as mentioned with reference to FIG. 6, at least one buffered user packet remains in the transmission queue 212, and the user packet is copied when it is read by the processing unit 213. In this way, measurement packets are transmitted so as not to be less than the test bandwidth. But it may be transmitted so as not to be less than the test bandwidth by another method. One example is explained with reference to FIG. 9.

Figure 9:
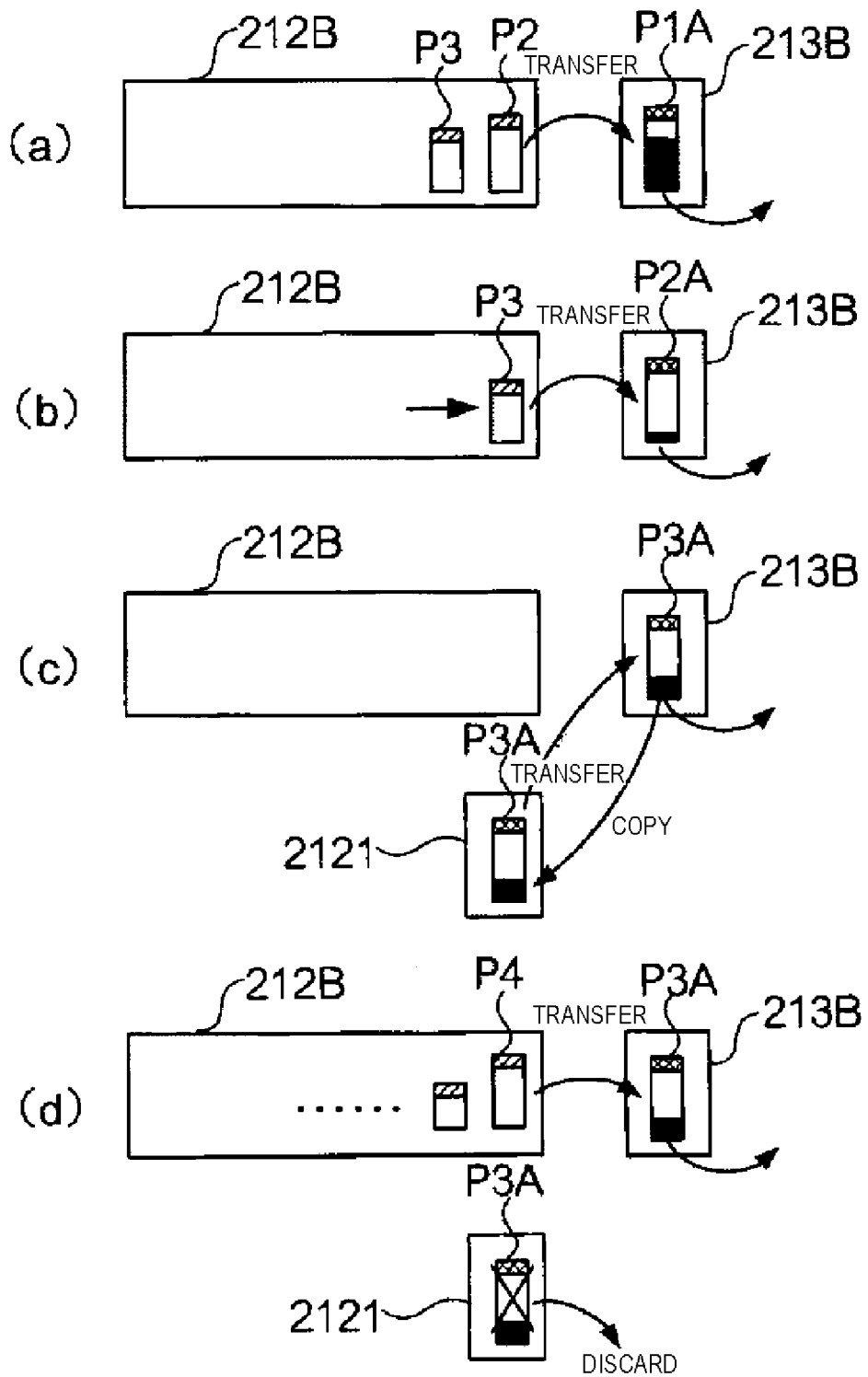
FIG. 9 illustrates an operation of a transmission-side bandwidth measurement processing according to a modification example 2.

FIG. 9 illustrates operations of the transmission queue 212B, the processing unit 213B and a copy buffer 2121 during an operation of the transmission-side bandwidth measurement processing according to a modification example 2. Until reaching an operation shown by (b) in FIG. 9, the operation is the same as until reaching the operation shown by (b) in FIG. 6 in the previously described embodiment. As shown by (b) in FIG. 9, when the measurement packet P2A is read, the processing unit 213B reads and processes the user packet P3 without copying even though the user packet P3 in the transmission queue 212B is the last user packet. In this case, the processing unit 213B performs processing of the user packet P3, and at the same time, allows the measurement packet P3A obtained by processing to be copied and buffered in the copy buffer 2121 (see (c) in FIG. 9).

And, when the measurement packet P3A is read from the processing unit 213B, the processing unit 213B reads the measurement packet P3A from the copy buffer 2121 to thereby re-record a measurement packet sequence number of measurement information (the prior number plus 1), and again copies the measurement packet P3A into the copy buffer 2121. Meanwhile, when performing reading from the copy buffer 2121, the processing unit 213B may copy the measurement packet P3A to thereby read it. Also, the last user packet P3 in the transmission queue 212B may be copied into the copy buffer 2121. In this case, addition of the dummy data PP to the processing unit 213B may also be necessary.

Next, by repeating this processing, if a new user packet is obtained from the VPN processing unit 211, likewise with the embodiment, the measurement packet P3A buffered in the copy buffer 2121 is discarded, and the processing unit 213B changes a mode to read the packet from the transmission queue 212B (see (d) in FIG. 9). In this way, a packet thus copied and transmitted may be buffered in another area different from the transmission queue 212.

Modification Example 3

If the copy buffer 2121 exists as in the foregoing modification example 2, a plurality of measurement packets capable of being buffered in the copy buffer 2121 may exist. Such case will be explained with reference to FIG. 10.

Figure 10:
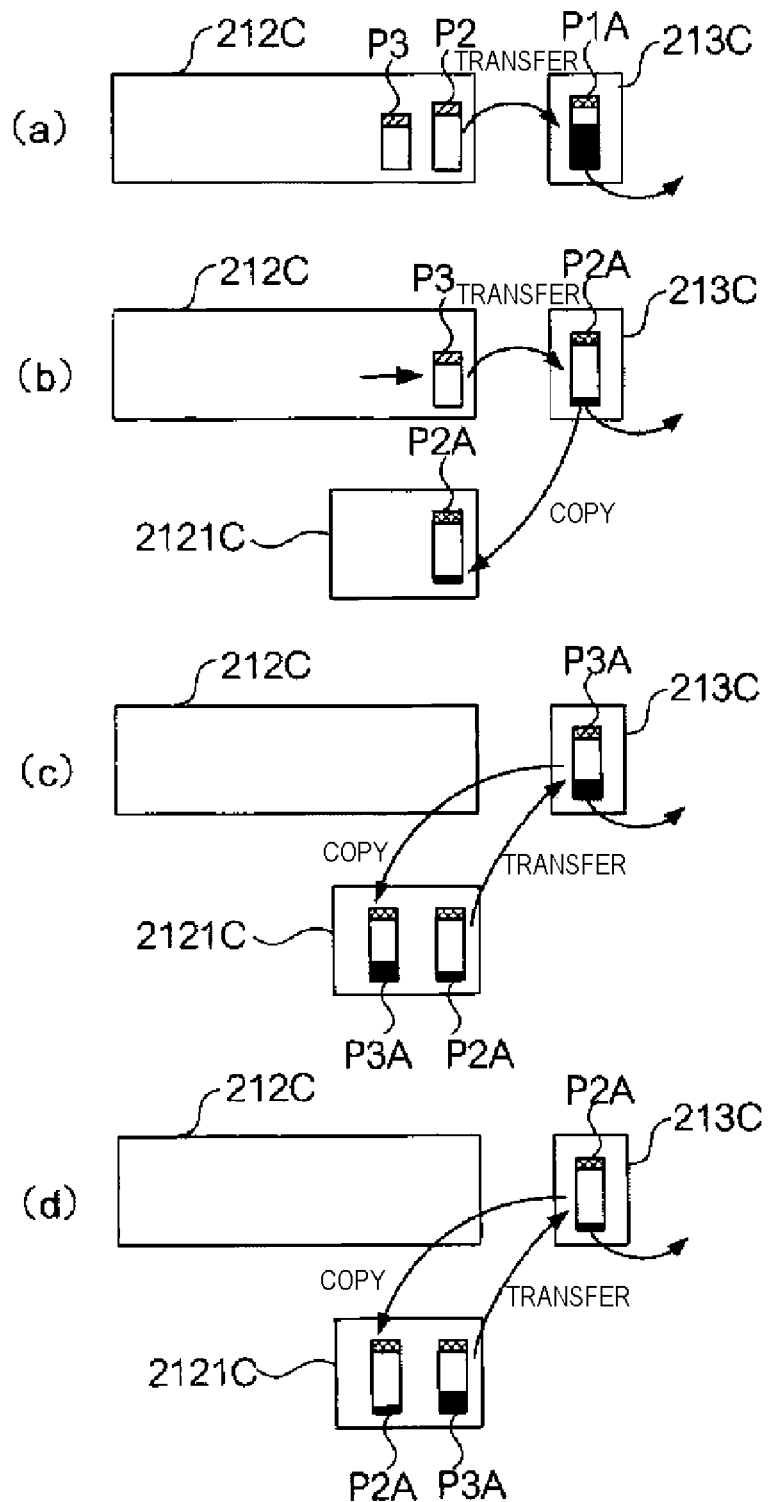
FIG. 10 illustrates an operation of a transmission-side bandwidth measurement processing according to a modification example 3.

FIG. 10 illustrates operations of the transmission queue 212C, the processing unit 213C and a FIFO type of copy buffer 2121C during an operation of the transmission-side bandwidth measurement processing according to a modification example 3. In FIG. 10, (a) is identical to (a) in FIG. 6 in the embodiment. When the measurement packet P1A is read from the processing unit 213C, the processing unit 213C reads the user packet P2 from the transmission queue 212C to perform processing of the packet, and at the same time, finds that the user packet buffered in the transmission queue 212C is less than two in its number. Then, the processing unit 213c copies the measurement packet P2A obtained by processing into the copy buffer 2121C (see (b) in FIG. 10). Meanwhile, the remaining number of being sensed for the user packets is not limited to two, but it may be more than three, or any number including a plurality may be possible.

Next, when the user packet P3 is read, the processing unit 213C buffers the measurement packet P3A in the copy buffer 2121C likewise (see (c) in FIG. 10). And, if the user packet buffered in the transmission queue 212C is exhausted and when the measurement packet P3A is read, the processing unit 213C reads the measurement packet P2A from the copy buffer 2121C, thereby re-recording measurement information and again copying the measurement packet P2A into the copy buffer 2121C (see (d) in FIG. 10). Then, this processing is repeated.

In this way, if a measurement packet having the same user data part PD is copied to be transmitted, even though a packet loss occurs until reaching another relay device 20, the user data PD may be reused when the copied measurement packet reaches the relay device 20, thereby enabling an efficient communication. Further, by increasing the number of measurement packets capable of being buffered in the copy buffer 2121C, a kind of the user data part PD capable of being reused increases thereby enabling an efficient communication. Meanwhile, even in this example, if a new user packet is buffered in the transmission queue 212C, the measurement packet buffered in the copy buffer 2121C is discarded.

Modification Example 4

In the foregoing embodiment, information of indicating a timestamp indicative of the time at which the measurement packet is transmitted to the communication network 10 may be included in the measurement information. In the relay device 20 which receives a measurement packet, by confirming the timestamp, it can be identified whether transmission of the measurement packet is performed accurately with respect to the set test bandwidth. Accordingly, even in case where the measured reception bandwidth is less than a test bandwidth, the reception-side relay device 20 can sense that a small bandwidth of transmission side causes the measurement packet not to be transmitted accurately according to the test bandwidth.

Modification Example 5

In the foregoing embodiment, when processing a user packet into a measurement packet, the processing unit 213 allows the user packet buffered in the transmission queue 212 to be remained, and the user packet is copied and processed as necessary. However, in a case where a user packet is exhausted from the transmission queue 212, dummy data PP not having a user data part PD and a measurement packet having a header part PH may be allowed to be transmitted. In this case, the copy packet determining unit 293 of the reception-side bandwidth measurement section 290 determines that a measurement packet not having the user data part PD is copied, and discards the packet.

Modification Example 6

In the foregoing embodiment, the relay device 20 uses a packet received from the LAN 30 as a measurement packet. However, a keep-alive packet that is periodically used between the relay devices 20 may be used as a measurement packet. That is, a packet to be transmitted to another relay device 20 as a packet produced in the relay device 20 may be used as a measurement packet.

Modification Example 7

In the foregoing embodiment, if the number of user packets buffered in the transmission queue 212 is less than a predetermined number, the processing unit 213 may process a user packet to increase the size of a measurement packet, and change an interval that the transmission control unit 214 reads a measurement packet to make a transmission interval of a measurement packet longer so that a test bandwidth may not be changed. In this case, the measurement information may be changed into a corresponding size in its measurement packet size so that information on a timestamp may be included therein, as described in the modification example 4. In this way, a pace at which the number of user packets buffered in the transmission queue 212 decreases can be suppressed.

Modification Example 8

In the foregoing embodiment, the VPN processing unit 211 of the transmission-side bandwidth measurement section 210 divides a packet so that it may become less than a predetermined size. However, in this example, the division may not be performed. In this case, when a user packet larger than a predetermined size is obtained by the transmission queue 212, since a measurement packet relating to the user packet becomes large in its size, it is preferable to maintain a set test bandwidth by changing an interval of reading a measurement packet by the transmission control unit 214. And, as indicated in the modification example 7, it is preferable to also change the measurement information.

Modification Example 9

In the foregoing embodiment, it is described that measurement of a usable bandwidth is performed by the relay device 20. In a case where there is a terminal connected directly to the communication network 10, however, it is preferable to make the terminal provided therein with the configuration (excluding the first communication IF unit 23) of the relay device 20. That is, measurement of a usable bandwidth is performed not only by a relay device 20 which connects the LAN 30 and the communication network 10, but also by whichever it is a communication device which transmits data to another device through the communication network 10.

Modification Example 10

In the foregoing embodiment, a relay device 20 which has transmitted a measurement packet receives resultant information transmitted from another relay device 20 which has received a measurement packet, thereby directly obtaining the resultant information. In this example, however, resultant information transmitted form a relay device 20 which has received a measurement packet is stored in a management server connected to the communication network 10 or the like. A relay device 20 which has transmitted a measurement packet receives the stored resultant information from the management server, thereby indirectly obtaining the resultant information. That is, the route that the relay device 20 which has transmitted a measurement packet obtains the resultant information transmitted from the relay device 20 which has received a measurement packet may be arbitrary.

Modification Example 11

The control program according to the foregoing embodiment may be provided in a state where it has been stored in a recording medium capable of being read by a computer, such as a magnetic recording medium (a magnetic tape, a magnetic disc, etc.), an optical recoding medium (an optical disc and the like), a magneto optical recoding medium, a semiconductor memory, etc. In this case, an interface capable of reading such recording medium may preferably be provided in the relay device 20. Also, it is possible to download the program via a network.

REFERENCE SIGNS LIST

1: communication system
10: communication network
20, 20A, 20B, 20C, 20D: relay device
21: control unit
22: UI unit
23: first communication IF unit
24: second communication IF unit
25: storing unit
26: bus
30, 30A, 30B, 30C, 30D: LAN
210: transmission-side bandwidth measurement section
211: VPN processing unit
212, 212-1, 212-2, 212-3, 212A, 212B, 212C: transmission queue
2121, 2121C: copy buffer
213, 213-1, 213-2, 213-3, 213A, 213B, 213C: processing unit
214: transmission control unit
290: reception-side bandwidth measurement section
291: measurement packet determining unit
292: VPN processing unit
293: copy packet determining unit
294: reception bandwidth measurement unit
295: measurement result notification processing unit

The invention claimed is:

1. A communication device, comprising:
a setting unit that is configured to set a test bandwidth indicative of a transmission rate to be tested in a communication with another device;
an acquisition unit that is configured to acquire a user packet in which user data indicative of contents to be transmitted to the other device is packetized;
a processing unit that is configured to assign measurement information indicative of the test bandwidth which is set by the setting unit to the user packet acquired by the acquisition unit, and to process the user packet to prepare a measurement packet so that a packet size of the measurement packet becomes a packet size corresponding to the test bandwidth; and
a transmission unit that is configured to transmit the measurement packet prepared by the processing unit to the other device at intervals determined so as to come into an environment in the test bandwidth which is set by the setting unit.

2. The communication device according to claim 1, further comprising
a resultant information receiving unit that is configured to receive resultant information which is transmitted from the other device which has received the measurement packet transmitted by the transmission unit, the resultant information being indicative of a result of comparing the test bandwidth with a reception-side transmission rate calculated in accordance with a reception aspect of the measurement packet.

3. The communication device according to claim 2, wherein
the setting unit is configured to change setting of the test bandwidth in accordance with the resultant information received by the resultant information receiving unit.

4. The communication device according to claim 1, wherein
the transmission unit is configured to transmit at least predetermined number of measurement packets, and when the number of measurement packets to be transmitted is insufficient as the number of the user packets does not reach the predetermined number, the transmission unit transmits a measurement packet prepared by processing a user packet including user data of a user packet which have been already transmitted.

5. A communication device, comprising:
a reception unit that is configured to receive a measurement packet in which user data indicative of contents to be transmitted by another device is packetized, to which measurement information indicative of a test bandwidth indicating a transmission rate to be tested in a communication with the other device is assigned, and which is processed so as to become a packet size according to the test bandwidth;
an extracting unit that is configured to extract a user packet before processed, from the measurement packet received by the reception unit; and
a measurement unit that is configured to measure a reception bandwidth indicative of a reception-side transmission rate from the other device based on a reception aspect of the measurement packet received by the reception unit.

6. The communication device according to claim 5, further comprising
a resultant information transmitting unit that is configured to transmit resultant information indicative of a result of comparing the reception bandwidth measured by the measurement unit with the test bandwidth indicated by the measurement information assigned to the measurement packet received by the reception unit.

7. The communication device according to claim 5, wherein
the extracting unit is configured to discard a measurement packet received by the reception unit without performing an extraction from the measurement packet, when a user packet part before processed in the measurement packet received by the reception unit is identical to a user packet part before processed in a measurement packet which has been already received before.

* * * * *